(12) United States Patent
Takamura et al.

(10) Patent No.: US 11,332,002 B2
(45) Date of Patent: May 17, 2022

(54) ENGINE INTAKE SYSTEM

(71) Applicant: Mazda Motor Corporation, Hiroshima (JP)

(72) Inventors: Yuta Takamura, Aki-gun (JP);
Motohiro Ariki, Aki-gun (JP);
Shigeaki Watanabe, Aki-gun (JP);
Kazuki Yamauchi, Aki-gun (JP);
Kuniyoshi Tashiro, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 147 days.

(21) Appl. No.: 16/929,136

(22) Filed: Jul. 15, 2020

(65) Prior Publication Data
US 2021/0023938 A1    Jan. 28, 2021

(30) Foreign Application Priority Data
Jul. 25, 2019   (JP) .............................. JP2019-136601

(51) Int. Cl.
| | | |
|---|---|---|
| *B60K 13/02* | (2006.01) | |
| *F02M 35/04* | (2006.01) | |
| *F02M 35/12* | (2006.01) | |
| *F02M 35/16* | (2006.01) | |
| *F02M 35/00* | (2006.01) | |

(52) U.S. Cl.
CPC ............. *B60K 13/02* (2013.01); *F02M 35/04* (2013.01); *B60Y 2306/09* (2013.01); *F02M 35/00* (2013.01); *F02M 35/12* (2013.01); *F02M 35/161* (2013.01)

(58) Field of Classification Search
CPC .......... B60K 13/02; F02M 5/04; F02M 35/12; F02M 35/161; F02M 35/00; B60Y 2306/09
See application file for complete search history.

(56) References Cited

U.S. PATENT DOCUMENTS

| | | | | |
|---|---|---|---|---|
| 8,430,193 B2 * | 4/2013 | Ve Lasco | ............... | B60K 11/04 180/68.1 |
| 8,528,679 B2 * | 9/2013 | Stuckey | ................. | B60K 11/08 180/68.3 |
| 2007/0113817 A1 * | 5/2007 | Awata | .................... | B60K 13/02 123/184.57 |
| 2015/0330284 A1 * | 11/2015 | Nam | .................... | F02M 35/161 123/41.7 |

FOREIGN PATENT DOCUMENTS

| | | |
|---|---|---|
| JP | H08-35457 A | 2/1996 |
| JP | 2019-034637 A | 3/2019 |

OTHER PUBLICATIONS

Extended European search report dated Jan. 15, 2021, in corresponding European patent Application No. 20186094.7, 6 pages.

\* cited by examiner

*Primary Examiner* — Syed O Hasan
(74) *Attorney, Agent, or Firm* — Xsensus LLP

(57) ABSTRACT

In an engine compartment, a separation wall is provided between an intake pipe, which runs around to a rear side of the engine from a lateral side of the engine, and the engine. On an outer side of this separation wall, a travel wind guide having a vertical wall portion that opposes the separation wall with the intake pipe being therebetween is provided. The travel wind guide guides vehicle travel wind that is introduced into the engine compartment in a manner to cause the vehicle travel wind to flow along the intake pipe on the outer side of the separation wall.

14 Claims, 11 Drawing Sheets

ENGINE INTAKE SYSTEM

CROSS-REFERENCE TO RELATED APPLICATION

The present application claims priority to JP 2019-136601, filed Jul. 25, 2019, the entire contents of which are incorporated herein by reference.

TECHNICAL FIELD

The present disclosure relates to an engine intake system.

BACKGROUND ART

An engine cover that covers an engine for thermal insulation and sound insulation is generally provided in an engine compartment of a vehicle. In Patent document 1, it is described that the engine compartment is provided with the engine cover in a manner to divide the engine compartment into a piping space where an intake pipe for introducing air into the engine is disposed and an accommodating space where the engine is accommodated. In this Patent document 1, the intake pipe runs on a lateral side of the engine cover, extends rearward of the vehicle, further runs around to a rear side of the engine, and is connected to the engine. According to an engine compartment structure in this document, heat transfer from the engine to the intake pipe is suppressed by the engine cover. Thus, a temperature increase of the air flowing through the intake pipe is avoided. As a result, a reduction in density of the air is suppressed, which is advantageous for prevention of degraded intake charging efficiency of the engine.

PRIOR ART DOCUMENTS

Patent Documents

[Patent document 1] JP-A-2019-34637

SUMMARY

Problems to be Solved by the Present Disclosure

As recognized by the present inventor, the engine and peripheral equipment thereof can be cooled when vehicle travel wind is introduced into the engine compartment. However, the travel wind that is introduced into the engine compartment spreads on both sides of the engine and flows rearward of the vehicle. Thus, even in the case where the intake pipe is arranged on the lateral side of the engine cover, an amount of the travel wind that hits the intake pipe is small, and the air that flows through the intake pipe cannot efficiently be cooled. This cooling issue is particularly pronounced, in the case where the intake pipe runs behind the rear side of the engine, where the travel wind is even less likely to provide a cooling effect on the air that flows through the intake pipe.

In view of the above, the present disclosure describes how to efficiently cool air flowing through an intake pipe of an engine by travel wind.

Means for Solving the Problems

In order to solve the above-described and other problems, the present disclosure describes a situation where an intake pipe snakes its way rearward of a vehicle on a lateral side of an engine. A separation wall is disposed between the engine and the intake pipe, and provides a travel wind guide that causes travel wind to flow along the intake pipe for a longer portion of a length of the intake pipe.

In an engine intake system disclosed herein, the engine is accommodated in an engine compartment, a front side of which is opened to introduce the travel wind, and
the engine compartment is provided with:
the intake pipe that introduces air into the engine, the air intake pipe extends rearward of the vehicle on the lateral side of the engine and runs around to a rear side of the engine;
the separation wall disposed between the engine and the intake pipe; and
a travel wind guide that includes a vertical wall portion that opposes the separation wall with the intake pipe being interposed therebetween and guides the travel wind to flow along the intake pipe on an outer side of the separation wall and to the rear side of the engine so as to suppress a temperature rise of the intake air in the intake pipe due to engine heat prior to the air being introduced to the engine.

According to system, heat transfer from the engine to the intake pipe is suppressed by the separation wall. In addition, since the travel wind is guided by the vertical wall portion of the travel wind guide in a manner to flow along the intake pipe on the outer side of the separation wall, the air that flows through the intake pipe can efficiently be cooled by the travel wind. Therefore, a temperature increase of the air flowing through the intake pipe is suppressed, which is advantageous for improvement in intake charging efficiency of the engine.

In one aspect, the vertical wall portion of the travel wind guide runs around to the rear side of the engine such that the travel wind flows along the intake pipe to the rear side of the engine. According to this, the travel wind can also be guided to the rear side of the engine. Thus, cooling efficiency of the air, which flows through the intake pipe, by the travel wind is further improved, which is advantageous for the improvement in the intake charging efficiency of the engine.

In one aspect, the travel wind guide includes an inclined portion in a front end portion of the vertical wall portion, the inclined portion extending obliquely outward in a manner to be separated from the intake pipe to front of the vehicle. According to this, the travel wind that is introduced into the engine compartment can be concentrated on the intake pipe by the inclined portion, which is advantageous for cooling of the air flowing through the intake pipe by the travel wind.

In one aspect, a front end of the inclined portion extends to a lateral wall of the engine compartment. According to this, an amount of the travel wind that can be concentrated on the intake pipe by the inclined portion is increased, which is further advantageous for cooling of the air flowing through the intake pipe by the travel wind.

In one aspect, the travel wind guide includes an eaves portion at an upper end of the vertical wall portion, the eaves portion is bulged to an upper side of the intake pipe, and a lower portion of the vertical wall portion is fixed to the separation wall. According to this, the travel wind is suppressed from escaping to portions above and below the intake pipe, which is further advantageous for cooling of the air flowing through the intake pipe by the travel wind.

Advantage of the Invention

According to the present disclosure, the separation wall is provided between the intake pipe, which snakes around to the rear side of the engine from the lateral side of the engine, and the engine, and the travel wind guide, which has the vertical wall opposing the separation wall with the intake pipe being interposed therebetween, is provided on the outer side of this separation wall. Thus, the heat transfer from the engine to the intake pipe is suppressed by the separation wall, and the travel wind is guided to flow along the intake pipe on the outer side of the separation wall by the vertical wall portion of the travel wind guide. As a result, the air that flows through the intake pipe can efficiently be cooled by the travel wind. Therefore, the temperature increase of the air flowing through the intake pipe is suppressed, which is advantageous for the improvement in the intake charging efficiency of the engine.

MODES FOR CARRYING OUT THE INVENTION

A description will hereinafter be made on a mode for carrying out the present disclosure with reference to the drawings. The following description is essentially and merely illustrative and thus has no intention to limit the present invention, application subjects thereof, and application thereof.

Figure 1:
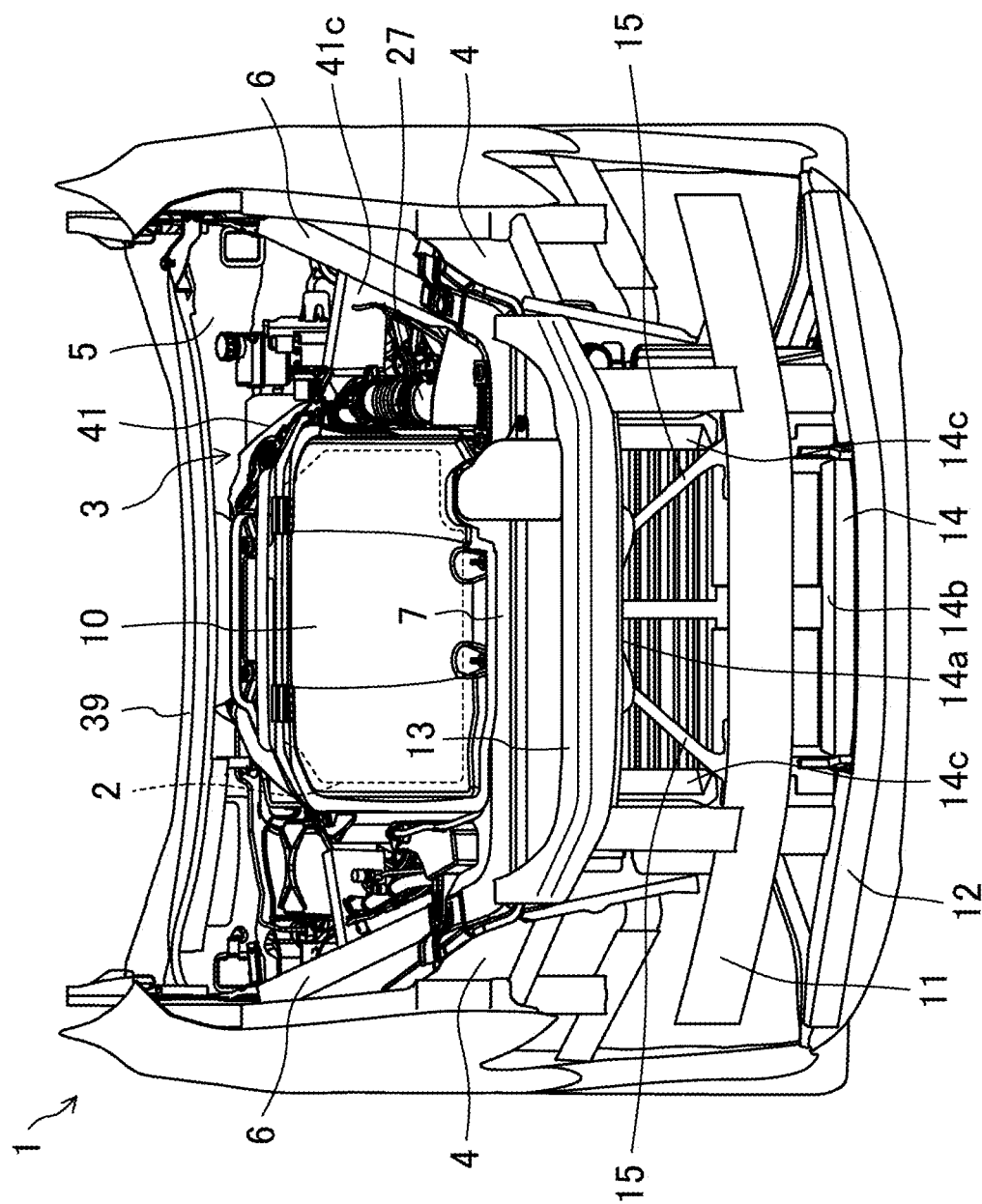
FIG. 1 is a perspective view illustrating an engine compartment of a vehicle.
Figure 2:
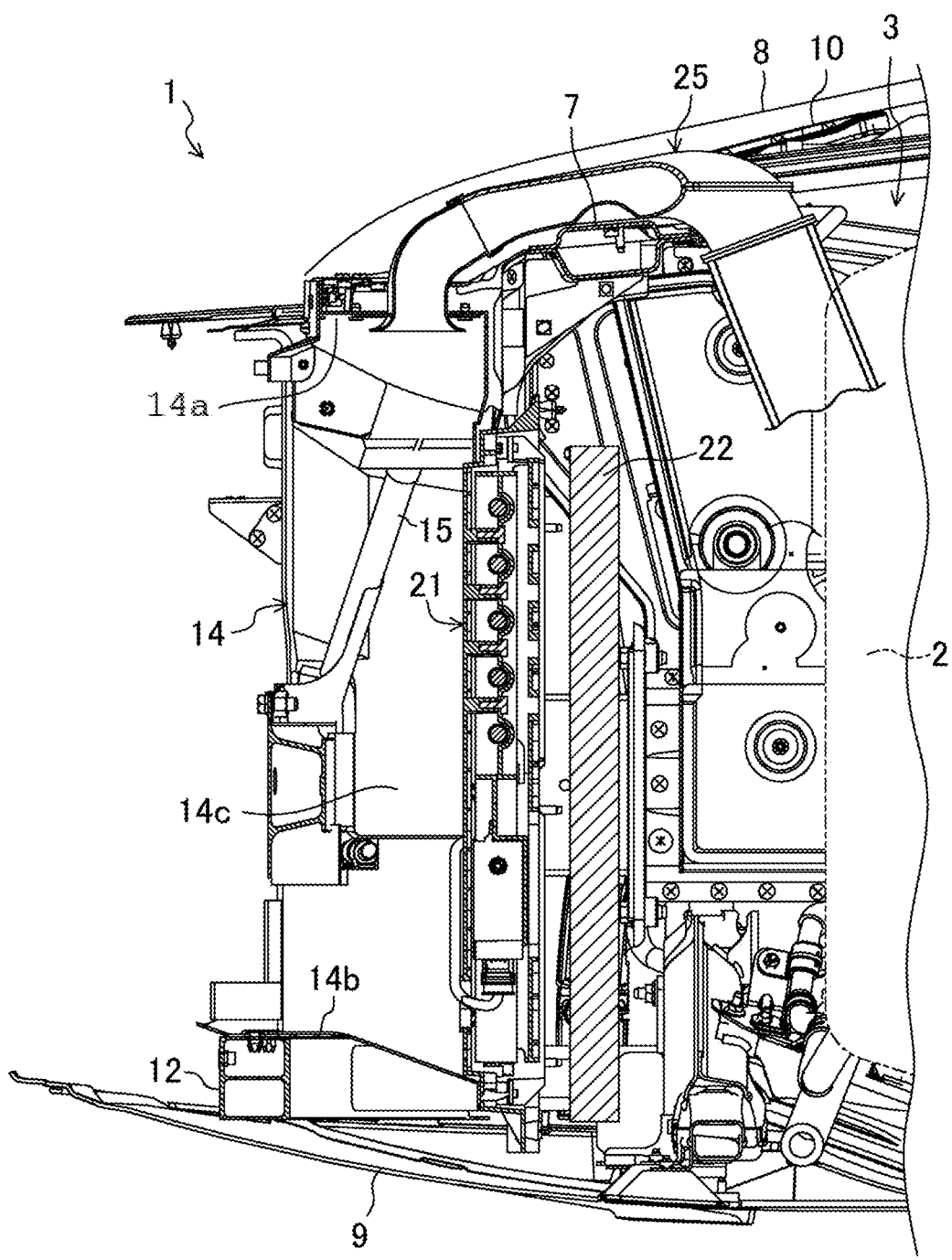
FIG. 2 is a vertical cross-sectional view illustrating a front portion of the engine compartment.

In a front portion of a vehicle 1 illustrated in FIG. 1, right and left walls of an engine compartment 3 for accommodating an engine 2 are each constructed of a wheel apron 4, and a rear wall thereof is constructed of a dashboard 5 that defines a cabin. An apron reinforcement 6 that extends in a vehicle longitudinal direction is provided on an upper edge of each of the right and left wheel aprons 4. Front ends of the right and left apron reinforcements 6 are coupled to each other by a cross reinforcement 7 that extends in a vehicle width direction. As illustrated in FIG. 2, an upper surface of the engine compartment 3 is covered with a hood 8, and a lower surface of the engine compartment 3 is covered with an under cover 9. A front side of the engine compartment 3 is opened so as to introduce travel wind thereinto. In FIG. 1, an engine cover 10 covers the engine 2.

<Front Structure of Engine Compartment 3>

As illustrated in FIG. 1, upper and lower bumper reinforcements 11, 12, each of which extends in the vehicle width direction, are provided in a front end portion of a vehicle body. A bumper face (not illustrated) is supported by these bumper reinforcements 11, 12. A frame member 13 that extends in the vehicle width direction is provided above the upper bumper reinforcement 11. Both ends of the frame member 13 are fixed to the cross reinforcement 7.

In a back portion of the upper bumper reinforcement 11, an air introducing portion 14 is provided to introduce the travel wind into the engine compartment 3 from a portion between the lower bumper reinforcement 12 and the frame member 13. The air introducing portion 14 includes an upper wall 14a, a lower wall 14b, and right and left side walls 14c, and is formed to have a rectangular cross-sectional shape. The upper wall 14a is fixed to the frame member 13, and the lower wall 14b is fixed to the lower bumper reinforcement 12. In addition, the upper wall 14a and the upper bumper reinforcement 11 are coupled by an oblique bar 15.

As illustrated in FIG. 2, a grille shutter 21 that regulates an introduction amount of the travel wind is fixed behind the air introducing portion 14. A radiator 22 for cooling a coolant of the engine 2 is provided at the rear of the grille shutter 21. An air inlet portion of an intake duct 25 is connected to the upper wall 14a of the air introducing portion 14 so as to introduce air into the engine 2 from the air introducing portion 14.

<Intake and Exhaust Systems of Engine>

Figure 3:
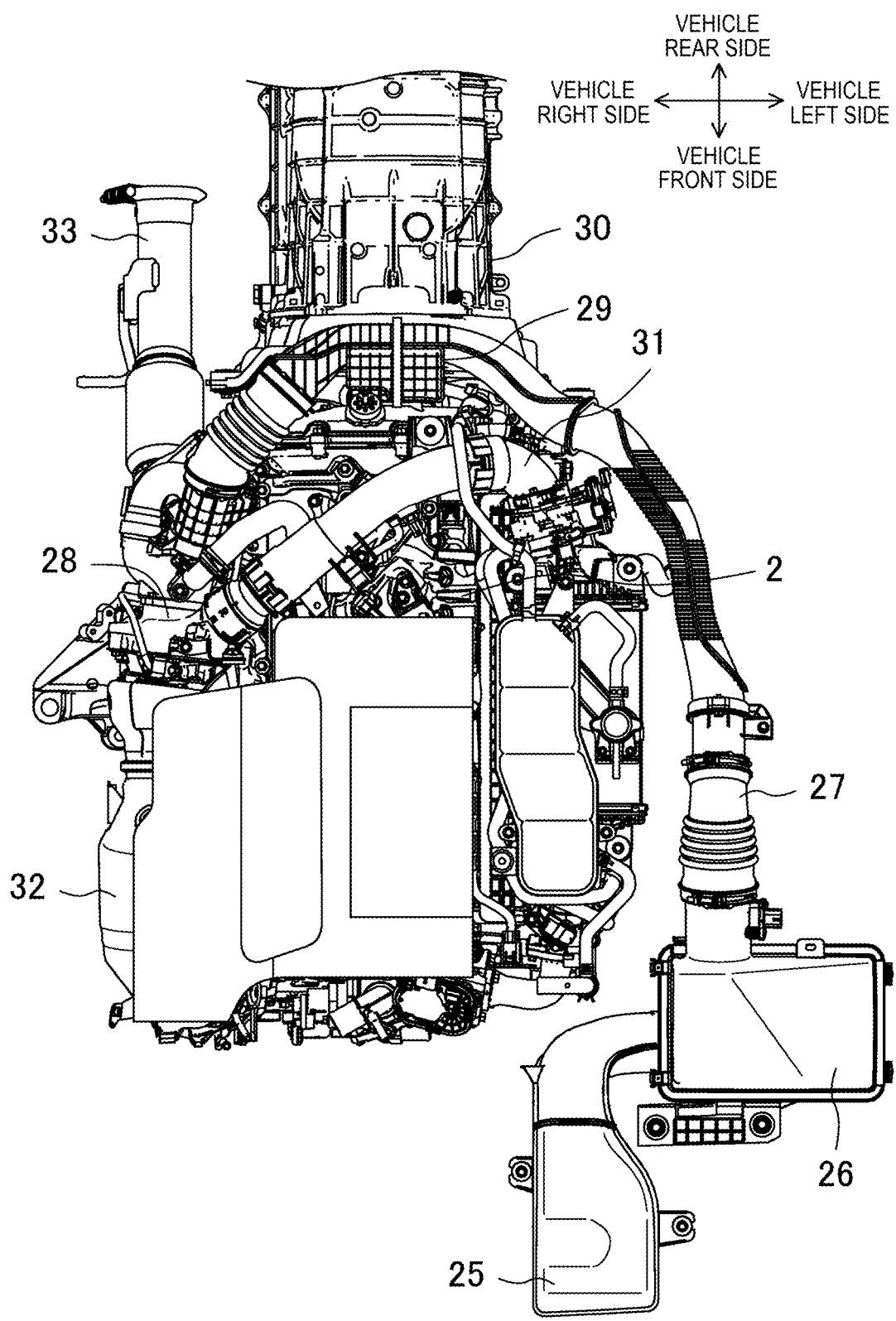
FIG. 3 is a plan view illustrating an engine and components of intake and exhaust systems.

As illustrated in FIG. 3, the engine 2 in this embodiment is a vertically-arranged engine, a cylinder bank direction (a crankshaft longitudinal direction) of which extends in the vehicle longitudinal direction. Moreover, the vertically arranged engine includes a bank of cylinders arranged in-line and that are oriented to move vertically up and down, overtop of the crankshaft. An intake manifold is provided on one side (a vehicle left side) of the engine 2 in the vehicle width direction, and an exhaust manifold is provided on an opposite side (a vehicle right side) thereof. Hereinafter, the side where the intake manifold of the engine 2 is provided will be referred to as an intake side, and the side where the exhaust manifold is provided will be referred to as an exhaust side.

The intake duct 25 is connected to an air cleaner 26 that is arranged on the intake side of the engine. At a position near the engine 2 (on the intake side), an intake pipe 27 extends rearward of the vehicle from the air cleaner 26. The intake pipe 27 runs around behind a rear side of the engine 2 (on an upper side of a transmission 30), extends from the rear side of the engine 2 to the exhaust side of the engine 2, and is connected to a turbocharger 28. An intake silencer 29 for reducing intake noise is provided on a portion of the intake pipe 27 that extends behind the engine rear side.

A turbocharger pipe 31 extends from a compressor of the turbocharger 28 to the intake side over an upper side of the engine 2. The air, a density of which is increased by actuation of the turbocharger 28, is delivered to the intake manifold through the turbocharger pipe 31. Exhaust gas that is exhausted from a turbine side of the turbocharger 28 flows through an exhaust gas purifier 32 and is delivered rearward of the vehicle through an exhaust pipe 33. The exhaust gas purifier 33 is arranged on the exhaust side of the engine 2.

<Engine Cover>

Figure 4:
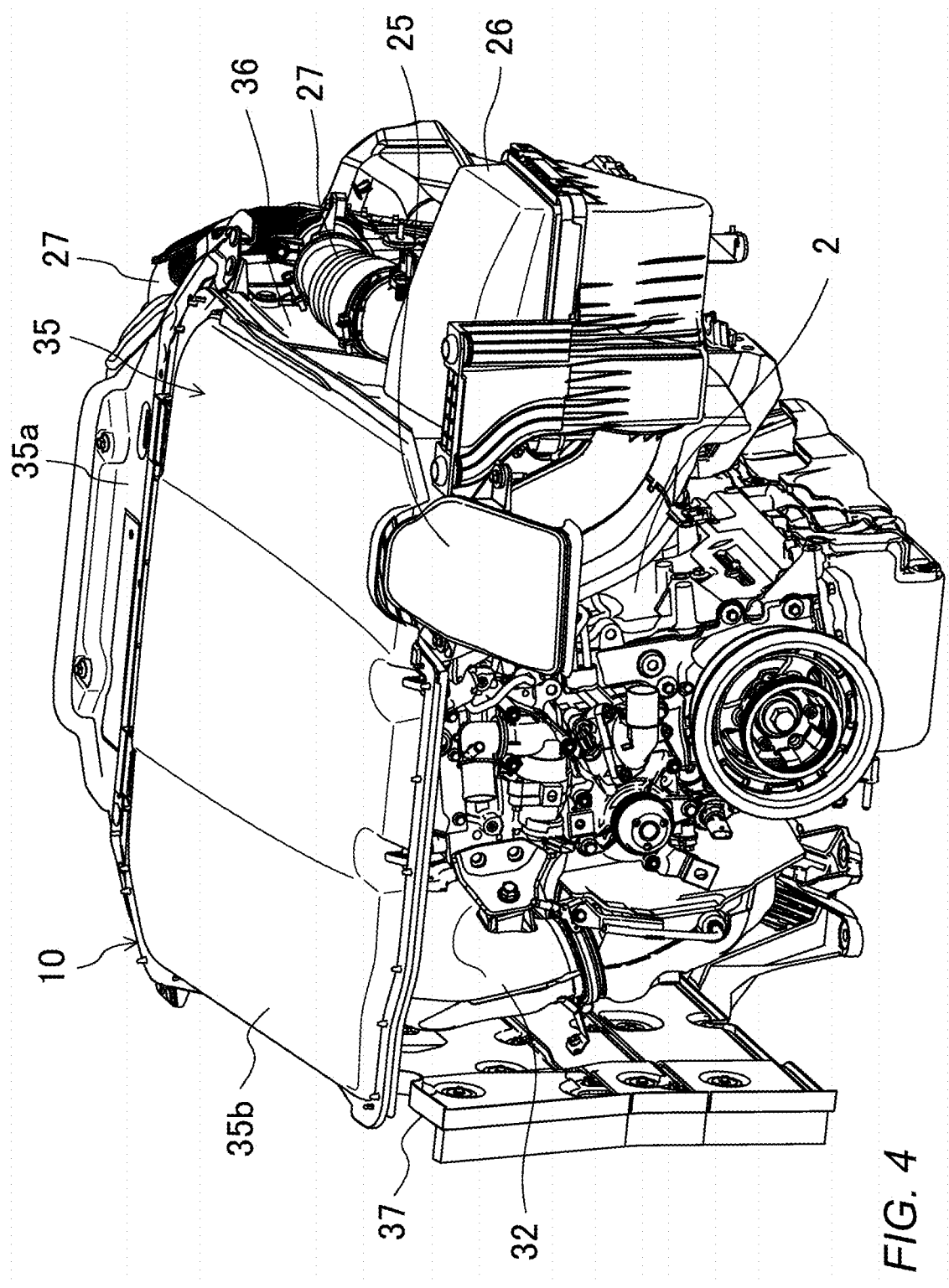
FIG. 4 is a perspective view illustrating the engine that is covered with an engine cover.

As illustrated in FIG. 4, the engine cover 10 includes: an upper surface cover 35 that covers an upper surface of the engine 2; a lateral surface cover 36 on the intake side that covers the intake side of the engine 2 and extends in the vehicle longitudinal direction; and a lateral surface cover 37 on the exhaust side that covers the exhaust side of the engine 2 and extends in the vehicle longitudinal direction. A front side of the engine 2 is not covered with the engine cover 10 and is opened to the front.

The upper surface cover 35 is configured to include a fixed cover 35a and a front openable cover 35b. As illustrated in FIG. 1, a rear edge of the fixed cover 35a is fixed to a cowl panel 39 (see FIG. 6) of the vehicle 1. A rear edge of the front openable cover 35b is pivotally supported by a front edge of the fixed cover 35a. The front openable cover 35b has a front edge that is clipped to the cross reinforcement 7, and can rotate upward (can be opened) when being unclipped.

Figure 5:
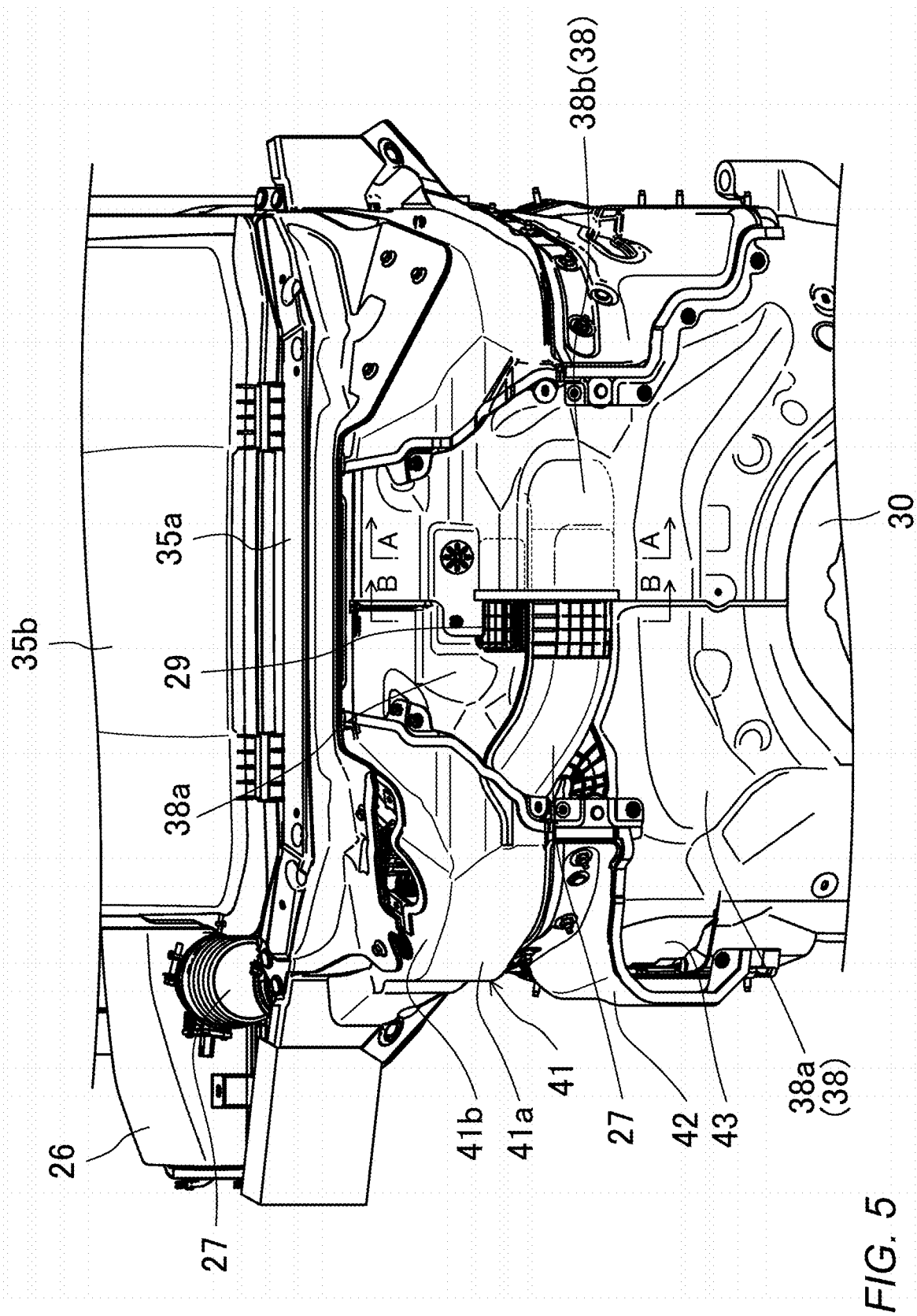
FIG. 5 is a perspective view in which the engine covered with the engine cover is seen from a rear side.

As illustrated in FIG. 5, the engine cover 10 further includes a rear surface cover 38 that covers a rear surface side of the engine 2. The rear surface cover 38 is configured to include a rear surface cover 38a on the intake side and a rear surface cover 38b on the exhaust side. In the rear surface cover 38a on the intake side and the rear surface cover 38b on the exhaust side, edges on a central side thereof overlap each other substantially at a center in the vehicle width direction of the engine 2, and overlapping portions are fixed by a clip or the like.

<Cooling of Air Flowing Through Intake Pipe with Travel Wind, or the Like>

The lateral surface cover 36 (FIG. 4 and FIG. 6) on the intake side and the rear surface cover 38a on the intake side of the engine cover 10 serve as separation walls that are disposed between the engine 2 and the intake pipe 27 in a manner to separate both of them from each other. The air cleaner 26 is also separated from the engine 2 by the lateral surface cover 36 on the intake side. A rear end of the lateral surface cover 36 on the intake side is connected to the rear surface cover 38a on the intake side.

Figure 6:
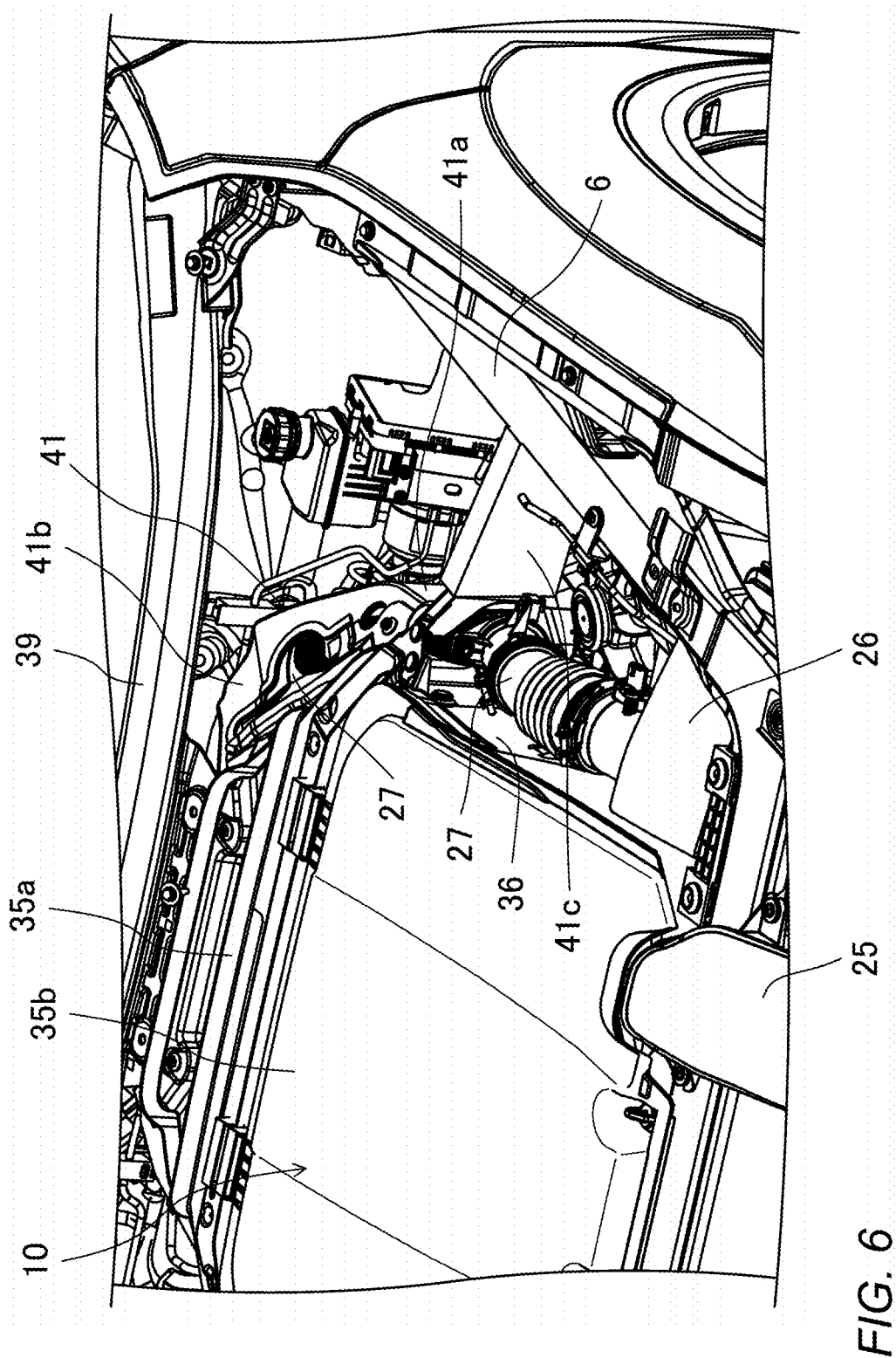
FIG. 6 is a perspective view illustrating a portion provided with a travel wind guide in the engine compartment.

As illustrated in FIG. 6, a travel wind guide 41 is provided on an outer side of a corner portion of the engine cover 10 from a rear portion of the lateral surface cover 36 on the intake side to the rear surface cover 38a on the intake side.

The travel wind guide 41 includes a vertical wall portion 41a that opposes the rear portion of the lateral surface cover 36 with the intake pipe 27 being interposed therebetween. As illustrated in FIG. 5, the vertical wall portion 41a runs around to the rear side of the engine 2, that is, behind the rear surface cover 38a from a lateral side of the lateral surface cover 36 along the intake pipe 27. Accordingly, also on the rear side of the engine 2, the vertical wall portion 41a opposes a portion of the rear surface cover 38a near the intake side with the intake pipe 27 being interposed therebetween. The travel wind guide 41 includes an eaves portion 41b, which bulges to an upper side of the intake pipe 27, at an upper end of the vertical wall portion 41a, and a lower portion of the vertical wall portion 41a is fixed to the lateral surface cover 36 and the rear surface cover 38a.

Furthermore, the travel wind guide 41 includes an inclined portion 41c, which extends obliquely outward in a manner to be separated from the intake pipe 27 to the front of the vehicle, in a front end portion of the vertical wall portion 41a located on the lateral side of the lateral surface cover 36. A front end of the inclined portion 41c extends to the wheel apron 4 and the apron reinforcement 6 that constitute a lateral wall of the engine compartment 3. That is, the inclined portion 41c obliquely crosses a portion between the vertical wall portion 41a and the lateral wall of the engine compartment 3.

Moreover, as illustrated in FIG. 5, on a lower side of the travel wind guide 41, a second guide 42 that extends rearward of the vehicle and guides the travel wind from the engine 2 to the transmission 30 is provided. This second guide 42 has a U-shaped cross-sectional shape, and, at a position below the travel wind guide 41, upper and lower flanges are fixed to the separation walls, that is, a portion from the lateral surface cover 36 to the rear surface cover 38a. The travel wind guide 41, the lateral surface cover 36, and the rear surface cover 38a form a travel wind introducing passage 43 through which the travel wind is guided to the transmission 30.

Thus, according to the above structure, heat of the engine 2 is blocked by the lateral surface cover 36 and the rear surface cover 38a, and is suppressed from being transferred to the intake pipe 27. In addition, the travel wind that is introduced into the engine compartment 3 and flows rearward of the vehicle on the intake side of the engine 2 is guided by the vertical wall portion 41a of the travel wind guide 41, and flows along the intake pipe 27 from the rear portion on the intake side of the engine 2 to the rear side of the engine 2. In this way, the air that flows through the intake pipe 27 is reliably cooled by the travel wind, which is advantageous for improvement in intake charging efficiency of the engine.

In the above embodiment, the travel wind that flows rearward of the vehicle on the intake side of the engine 2 is guided in a manner to be concentrated toward the intake pipe 27 by the inclined portion 41c provided at the front end of the vertical wall portion 41a. Thus, an amount of the travel wind that flows along the intake pipe 27 is increased. Furthermore, the eaves portion 41b, which bulges to the upper side of the intake pipe 27, is provided at the upper end of the vertical wall portion 41a, and the lower portion of the vertical wall portion 41a is fixed to the lateral surface cover 36 and the rear surface cover 38a. Thus, the travel wind is suppressed from escaping to the portions above and below the intake pipe 27.

Just as described, the vehicle travel wind is efficiently used to cool the air flowing through the intake pipe 27, which is advantageous for the improvement in the intake charging efficiency of the engine.

In addition, since the travel wind introducing passage 43 that guides the travel wind to the transmission 30 is formed below the travel wind guide 41, the transmission 30 can efficiently be cooled by the travel wind.

<Intake Silencer>

Figure 7:
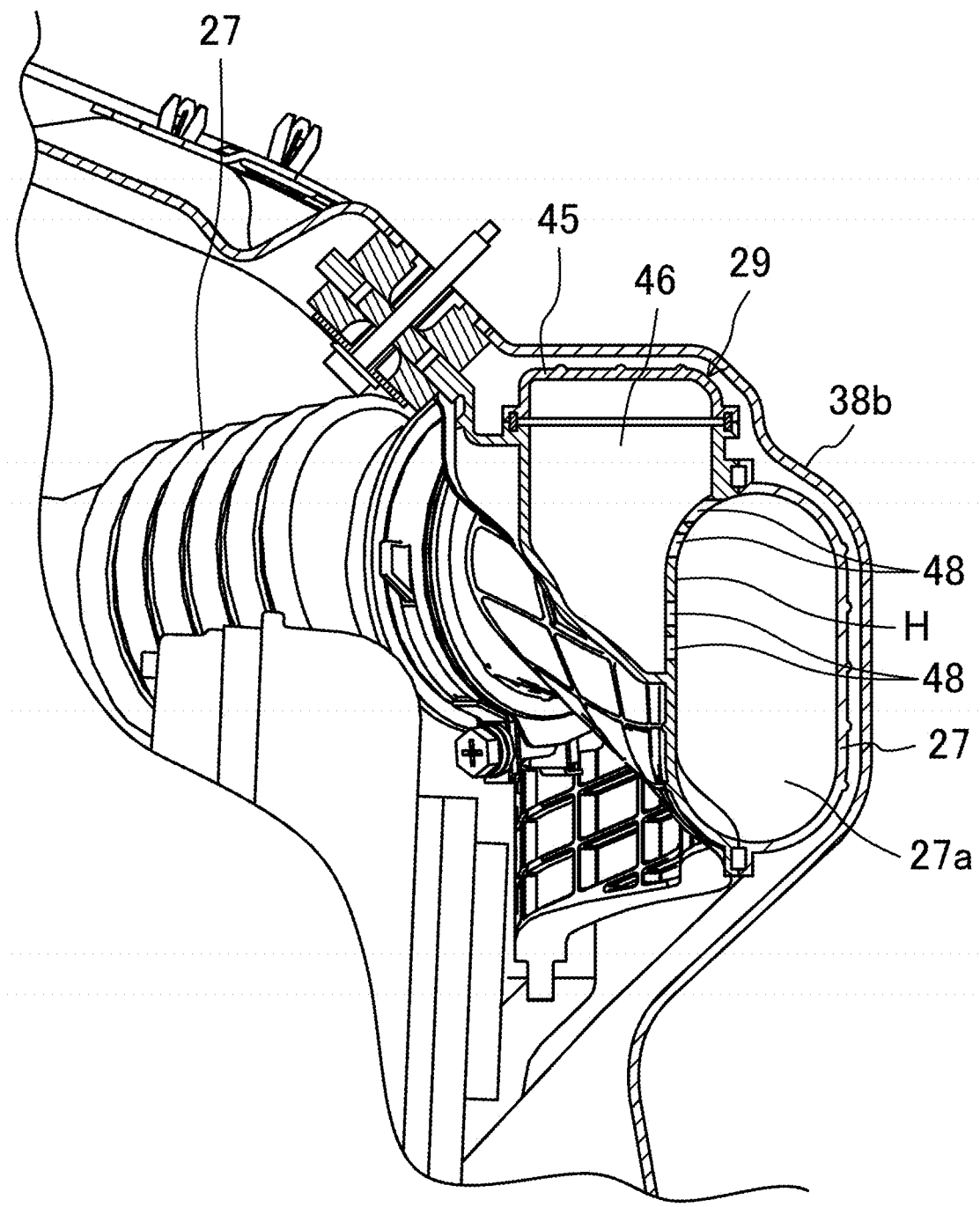
FIG. 7 is a cross-sectional view that is taken along A-A in FIG. 5.
Figure 8:
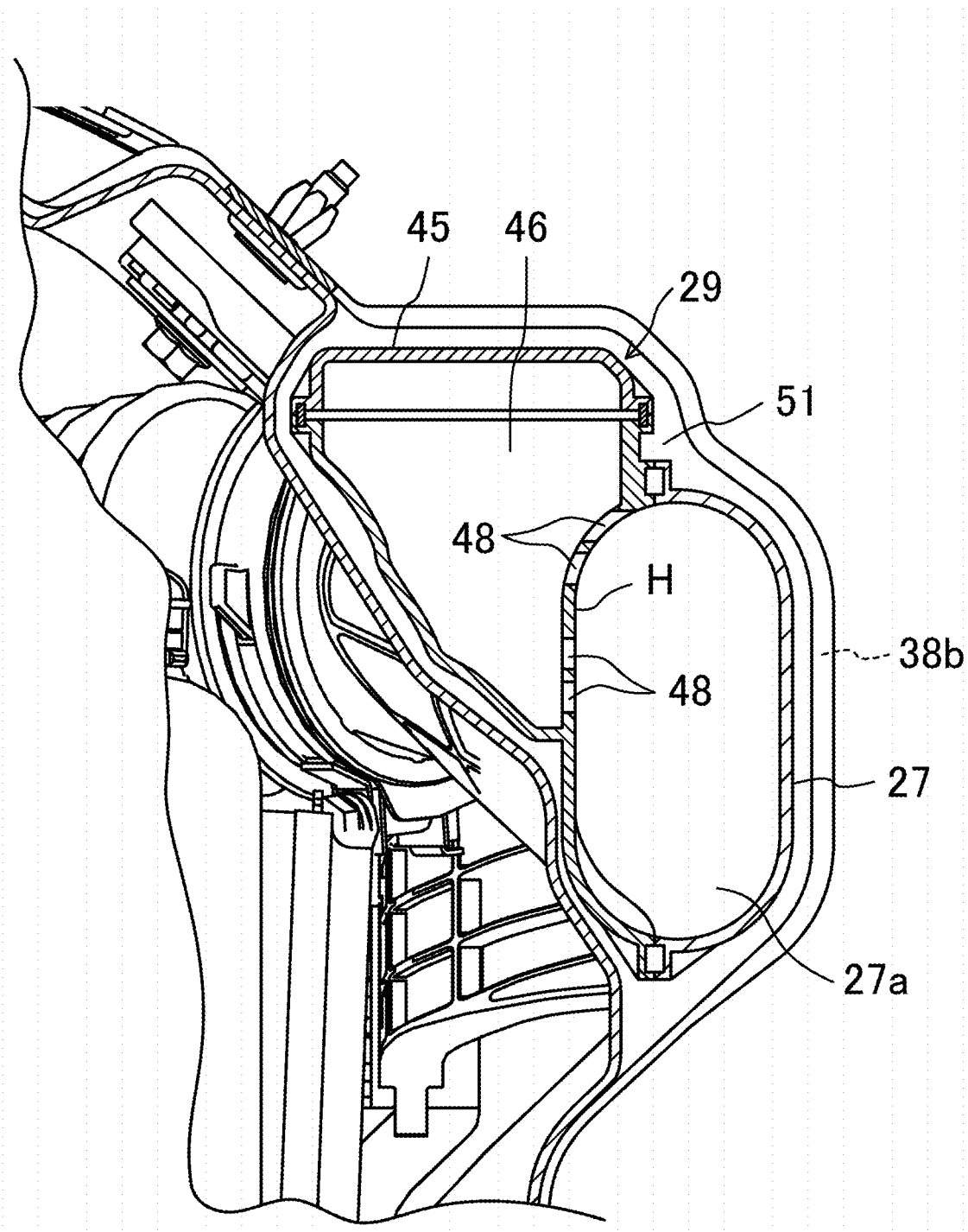
FIG. 8 is a cross-sectional view that is taken along B-B in FIG. 5.

As illustrated in FIG. 3, the intake silencer 29 that is provided in a portion of the intake pipe 27 running on the rear side of the engine 2 is a reactive-type silencer that suppresses pressure fluctuation of the air in the intake pipe 27 to reduce intake sound and, more specifically, is an expandable silencer. An expanding portion 45 that forms an expansion chamber of the intake silencer 29 is bulged from the intake pipe 27 to the engine 2 side that is an opposite side from the cabin. That is, as illustrated in FIG. 7 and FIG. 8, an expansion chamber 46 (46b, 46c) of the intake silencer 29 is formed to be bulged from the intake pipe 27 to the opposite side (the engine 2 side) from the cabin. In this embodiment, the expansion chamber 46 is projected obliquely upward from an upper half circumferential portion on the engine 2 side of the intake pipe 27.

Figure 9:
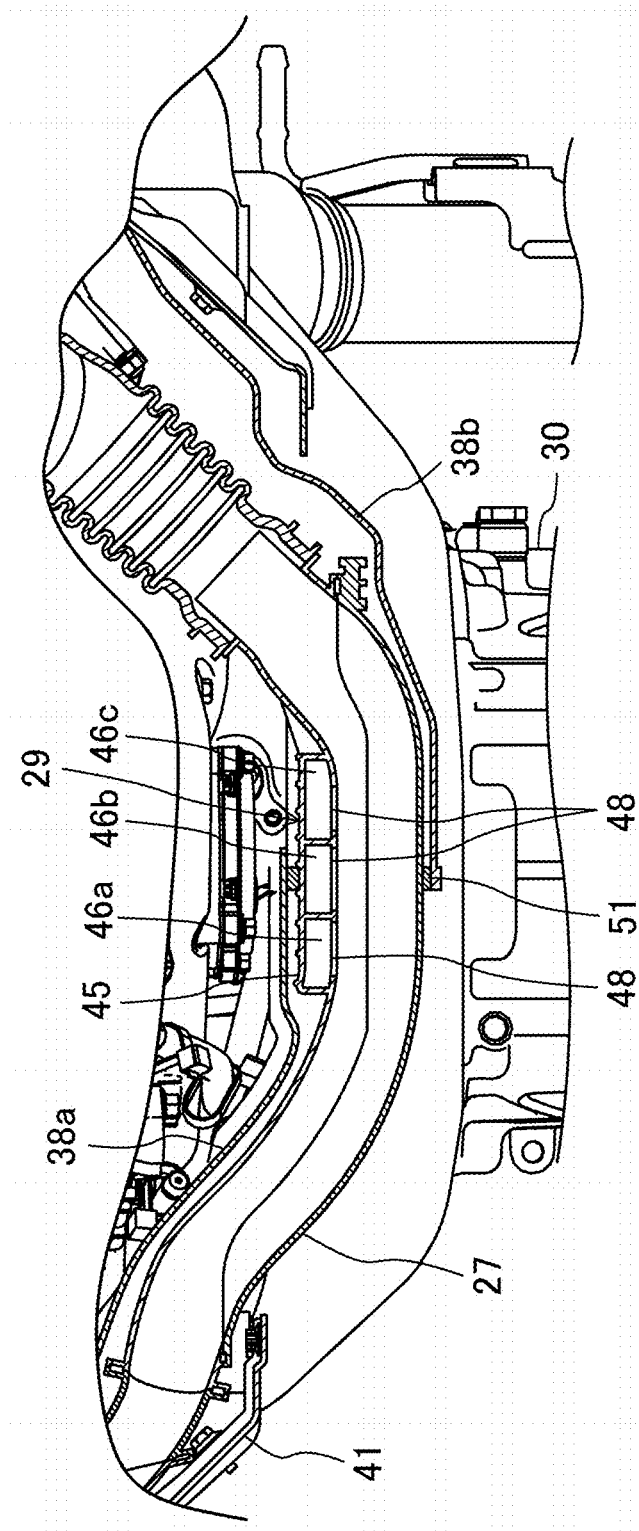
FIG. 9 is a transverse cross-sectional view of a portion of an intake pipe that runs around to a rear side of the engine.
Figure 10:
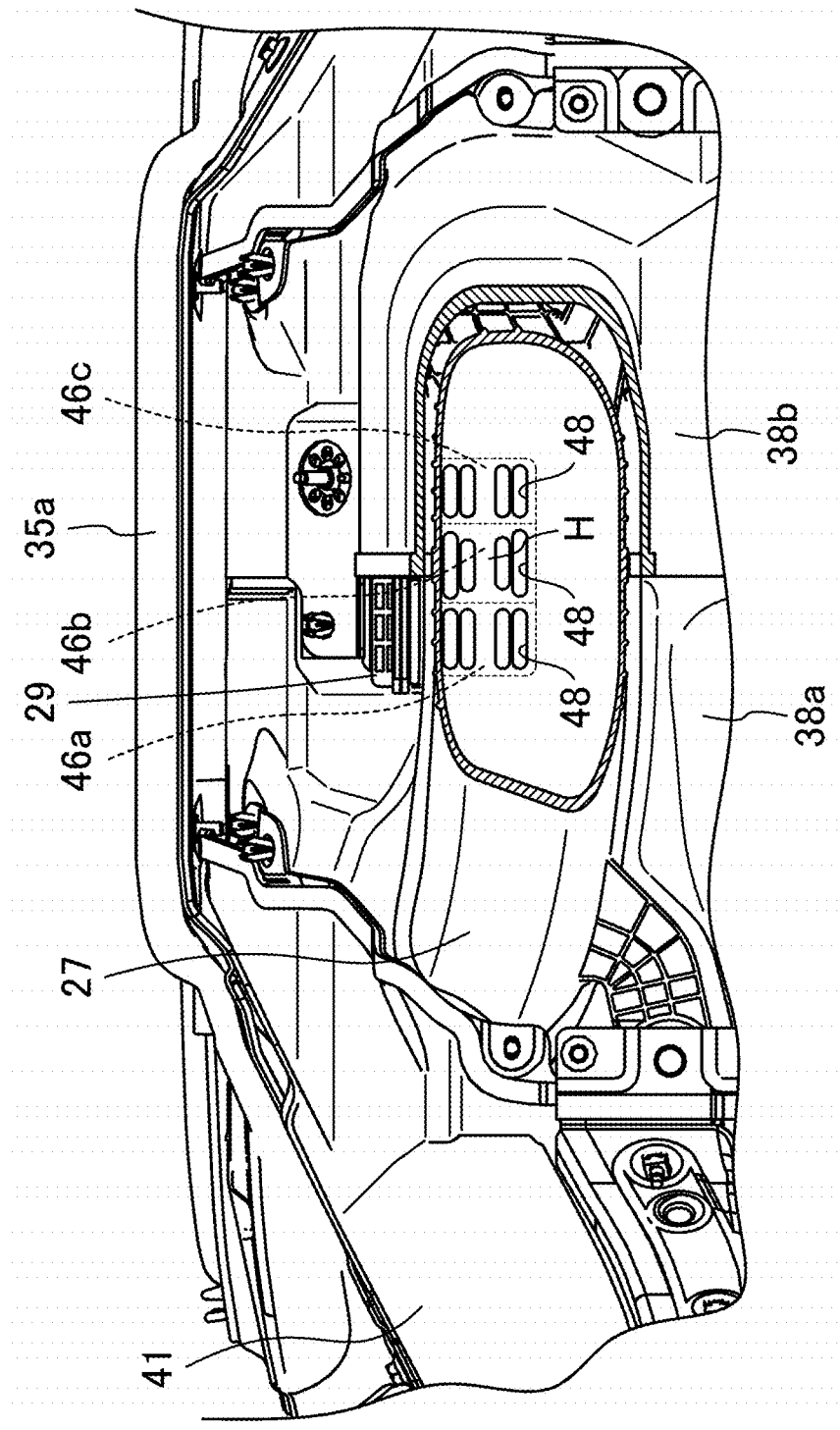
FIG. 10 is a perspective view in which the intake pipe is partially cut and an intake silencer is seen from behind.

In addition, of the expandable silencers, the intake silencer 29 in this embodiment is a porous expandable silencer in which a plurality of vent holes 48 is formed in a separation wall 47 that separates an intake passage 27a, through which the air to be introduced into the engine 2 flows, and the expansion chamber 46 from each other. As illustrated in FIG. 9, the expanding portion 45 is partitioned into three expansion chambers 46a, 46b, 46c by partition walls. The expansion chambers 46a, 46b, 46c are aligned in a longitudinal direction of the intake pipe 27. As illustrated in FIGS. 8 and 10, each of the expansion chambers 46a, 46b, 46c communicates with the intake passage 27a by the plurality of the vertically-aligned vent holes 48. Hereinafter, the expansion chambers 46a, 46b, 46c will collectively be referred to as the "expansion chamber 46".

As illustrated in FIG. 9, on the rear side of the engine 2, the intake pipe 27 is curved to be projected to the cabin side and, as illustrated in FIG. 7, a portion thereof in which the intake silencer 29 exists is curved such that a height of the intake passage 27a is lower than both sides thereof. The air attempts to flow in the shortest distance when flowing through the intake passage 27a from one side to another side. Thus, as a result of the curvature of the intake pipe 27 as described above, a flow rate of the air that flows along a wall surface on the intake passage 27a side of the separation wall 47 also becomes the highest in a substantially central portion H in a vertical direction of the separation wall 47.

Thus, as illustrated in FIGS. 7, 8, 10, in this embodiment, the vent holes 48 are opened to portions that are separated to both of upper and lower sides from the portion H, in which the flow rate of the air is the highest, in the wall surface of the separation wall 47 and in each of which the flow rate is relatively low.

As illustrated in FIG. 5, the intake pipe 27 that runs out of the travel wind guide 41 and runs around to the rear side of the engine 2 extends to the exhaust side of the engine 2 in a state where an outer surface of the rear surface cover 38a on the intake side is exposed from the rear surface cover 38a. Then, the intake pipe 27 enters an inner side of the rear surface cover 38b on the exhaust side from an end on an engine central side of the rear surface cover 38b. The intake silencer 29 is arranged at a position from the rear surface cover 38a on the intake side to the rear surface cover 38b on the exhaust side. Accordingly, an upstream portion of the intake silencer 29 in an air flow direction of the intake pipe 27 is exposed to the outer side of the rear surface cover 38a on the intake side, and a downstream portion thereof is covered with the rear surface cover 38b on the exhaust side.

Figure 11:
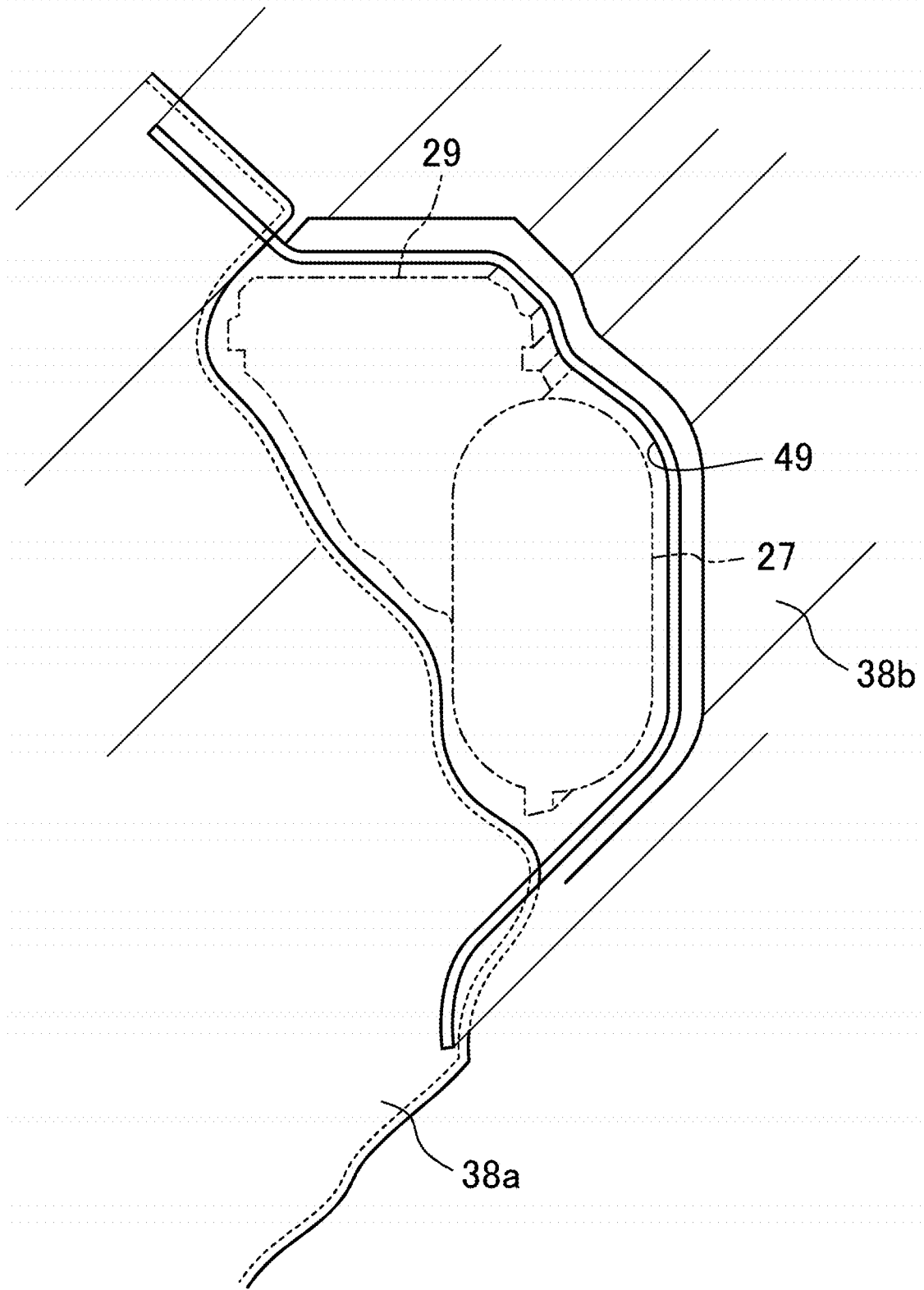
FIG. 11 is a perspective view illustrating a connected portion between a rear surface cover on an intake side and a rear surface cover on an exhaust side.

In summary, as illustrated in FIG. 11, in a boundary portion between the rear surface cover 38a on the intake side and the rear surface cover 38b on the exhaust side, the engine cover 10 is formed with a through hole 49 by denting the outer surface of the rear surface cover 38a on the intake side to the inner side in a manner to conform to an outer shape of the intake silencer 29 and bulging an outer surface of the rear surface cover 38b on the exhaust side to the outer side. The intake silencer 29 is inserted in the through hole 49 of the engine cover 10 and is fitted to this through hole 49 via a seal member 51. The seal member 51 is formed of a sponge material having compressibility, and the intake silencer 29 is elastically supported by the engine cover 10 using the seal member 51.

A portion of the intake pipe 27 from the downstream portion of the intake silencer 29 to the turbocharger 28 and the turbocharger 28 are covered with the rear surface cover 38b on the exhaust side and the lateral surface cover 37 on the exhaust side from the outer side.

Thus, in the above structure, only the downstream portion of the intake silencer 29 is covered with the engine cover 10, and the upstream portion thereof is exposed to the outside and cooled by the travel wind. As a result, a temperature increase of the air at the time of flowing through the intake silencer 29 (a reduction in the density of the air) is suppressed. Therefore, this is advantageous for prevention of the degraded intake charging efficiency of the engine 2 and securement of engine output.

In the above structure, in conjunction with the actuation of the turbocharger 28, the air pressure fluctuates in the portion of the intake pipe 27 on the upstream side of the turbocharger 28, and generates the intake sound. However, since a portion from the turbocharger 28 to the intake pipe 27 on the upstream side and the downstream portion of the intake silencer 29 is covered with the engine cover 10, radiated sound from such a portion is blocked and absorbed by the engine cover 10.

In the intake silencer 29, due to the communication between the portion thereof on the intake passage 27a side and the expansion chamber 46 by the vent holes 48, the pressure fluctuation on the intake passage 27a side is absorbed by the expansion chamber 46, and the intake noise is suppressed. Meanwhile, when being influenced by the pressure fluctuation, the sound is radiated from the intake silencer 29 itself. However, since the expansion chamber 46 of the intake silencer 29 is arranged on the engine 2 side as the opposite side from the cabin, an amount of the radiated noise to the cabin side is reduced. In addition, since the downstream portion of the intake silencer 29 is covered with the rear surface cover 38b on the exhaust side, the radiated sound from the intake silencer 29 is blocked and absorbed by the rear surface cover 38b. Therefore, transmission of secondary noise to the cabin side by the intake silencer 29 as a generation source is suppressed.

Here, that the downstream portion of the intake silencer 29 is covered with the engine cover 10 and the upstream portion thereof is exposed to the outer side and cooled by the travel wind means that a temperature difference occurs in the intake silencer 29. That is, the temperature of the downstream portion of the intake silencer 29 is higher than the upstream portion thereof. A speed of the sound that is propagated in the air differs by the temperature of the air. Thus, a frequency range with a silencing effect differs by the temperature. As described above, the temperature is generated in said intake silencer 29, and thus can exert an effect of expanding the silencing frequency range.

In the case of this example, during actuation of the engine 2, of the three expansion chambers 46a, 46b, 46c that are aligned in the longitudinal direction of the intake pipe 27, the expansion chamber 46a on the upstream side that is exposed from the engine cover 10 has the low temperature, the expansion chamber 46c on the downstream side that is covered with the engine cover 10 has the high temperature, and the intermediate expansion chamber 46b has the intermediate temperature. Due to the difference in the temperature among these expansion chambers 46a, 46b, 46c, the silencing frequency range is expanded.

A frequency of the intake sound by the turbocharger 28 as the generation source is relatively high (several kHz). However, since the intake silencer 29 is partially covered with the engine cover 10, compared to a case where such a cover is not provided, the silencing frequency range is expanded to a high frequency side, which is advantageous for the reduction in the intake sound that is associated with the actuation of the turbocharger 28. In particular, since the portion on the turbocharger 28 side of the intake silencer 29 (the expansion chamber 46c on the downstream side) is covered with the engine cover 10, it is possible to effectively suppress the intake sound associated with the actuation of the turbocharger 28.

In the intake silencer 29, the vent holes 48 of the separation wall 47 are opened to the portions that are separated from the portion having the highest flow rate of the air in the wall surface on the intake passage 27 aside and in each of which the flow rate is relatively low. Thus, separation of the air flow is slight in an opened portion of each of the vent holes 48 when the air flows along the wall surface of the separation wall 47. That is, disruption of the air flow does not become significant. As a result, the generation of the noise by the generation of a swirl of the air and the pressure fluctuation is suppressed, and pressure loss in the intake silencer 29 is not significant, which is advantageous in a point of securing the intake charging efficiency of the engine 2.

Furthermore, in the above structure, the intake silencer 29 is elastically supported by the engine cover 10 using the seal member 51. Therefore, vibration of the intake silencer 29 is suppressed by the seal member 51, which is advantageous for the reduction in the vibration and the sound.

DESCRIPTION OF REFERENCE SIGNS AND NUMERALS

1: Vehicle
2: Engine
3: Engine compartment
4: Wheel apron
5: Dashboard
6: Apron reinforcement
8: Hood
9: Under cover
10: Engine cover
27: Intake pipe
36: Side surface cover (separation wall)
38*a*: Rear surface cover (separation wall)
41: Travel wind guiding member
41*a*: Vertical wall portion
41*b*: Eaves portion
41*c*: Inclined portion

The invention claimed is:

1. An engine intake system for a vehicle having an engine accommodated in an engine compartment, a front side of the engine compartment is opened to introduce travel wind, the engine intake system comprising: an intake pipe that introduces air into the engine, the air intake pipe extends rearward along a lateral side of the engine and around a rear side of the engine; a separation wall disposed between the engine and the intake pipe; and a travel wind guide that includes a vertical wall portion that opposes the separation wall with the intake pipe being interposed therebetween and guides the travel wind to flow along the intake pipe on an outer side of the separation wall and to the rear side of the engine so as to suppress a temperature rise of the intake air in the intake pipe due to engine heat prior to the air being introduced to the engine, wherein the vertical wall portion of the travel wind guide also extends around to the rear side of the engine such that the travel wind also flows along the intake pipe on the rear side of the engine, and the travel wind guide includes an inclined portion in a front end of the vertical wall portion, the inclined portion extending obliquely outward to be separated from the intake pipe toward the front side of the engine compartment.

2. The engine intake system according to claim 1, wherein the travel wind guide includes an inclined portion in a front end of the vertical wall portion, the inclined portion extending obliquely outward so as to be separated from the intake pipe toward the front side of the engine compartment.

3. The engine intake system according to claim 1, wherein a front end of the inclined portion extends to a lateral wall of the engine compartment.

4. The engine intake system according to claim 2, wherein a front end of the inclined portion extends to a lateral wall of the engine compartment.

5. The engine intake system according to claim 1, wherein the travel wind guide includes an eaves portion at an upper end of the vertical wall portion, the eaves portion having a shape that is bulged toward an upper side of the intake pipe, and
a lower portion of the vertical wall portion is fixed to the separation wall.

6. The engine intake system according to claim 1, wherein the travel wind guide includes an eaves portion at an upper end of the vertical wall portion, the eaves portion having a shape that is bulged toward an upper side of the intake pipe, and a lower portion of the vertical wall portion is fixed to the separation wall.

7. The engine intake system according to claim 1, wherein the travel wind guide includes an eaves portion at an upper end of the vertical wall portion, the eaves portion having a shape that is bulged toward an upper side of the intake pipe, and a lower portion of the vertical wall portion is fixed to the separation wall.

8. The engine intake system according to claim 2, wherein the travel wind guide includes an eaves portion at an upper end of the vertical wall portion, the eaves portion having a shape that is bulged toward an upper side of the intake pipe, and
a lower portion of the vertical wall portion is fixed to the separation wall.

9. An engine intake system for a vehicle having an engine accommodated in an engine compartment, a front side of the engine compartment is opened to introduce travel wind, the engine intake system comprising: an intake pipe that introduces air into the engine, the air intake pipe extends rearward along a lateral side of the engine and around a rear side of the engine; a separation wall disposed between the engine and the intake pipe; and a travel wind guide that includes a vertical wall portion that opposes the separation wall with the intake pipe being interposed therebetween and guides the travel wind to flow along the intake pipe on an outer side of the separation wall and to the rear side of the engine so as to suppress a temperature rise of the intake air in the intake pipe due to engine heat prior to the air being introduced to the engine, wherein the vertical wall portion of the travel wind guide also extends around to the rear side of the engine such that the travel wind also flows along the intake pipe on the rear side of the engine, and the engine intake system further comprising an intake silencer provided in a portion of the intake pipe that suppresses air pressure fluctuations in the intake pipe and suppresses corresponding sounds associated with the air pressure fluctuations, the intake silencer is disposed at the rear side of the engine.

10. The engine intake system according to claim 9, wherein
the intake silencer is an expandable silencer having at least one expansion chamber.

11. The engine intake system according to claim 10, wherein
the at least one expansion chamber is configured to bulge from the intake pipe away from a cabin of the vehicle.

12. The engine intake system according to claim 10, wherein
the expandable silencer is a porous expandable silencer.

13. The engine intake system according to claim 12, wherein
the porous expandable silencer is disposed at the rear side of the engine.

14. The engine intake system according to claim 13, wherein
the intake pipe and the at least one expansion chamber of the porous expandable silencer include a plurality of vent holes therebetween.

* * * * *